(12) United States Patent
Nikula

(10) Patent No.: US 6,563,884 B1
(45) Date of Patent: May 13, 2003

(54) METHOD AND APPARATUS FOR SEAMLESSLY CHANGING THE RADIO INTERFACE DATA RATE IN CIRCUIT SWITCHED TRANSMISSION

(75) Inventor: Eero Nikula, Espoo (FI)

(73) Assignee: Nokia Mobile Phones Limited, Espoo (FI)

(*) Notice: Subject to any disclaimer, the term of this patent is extended or adjusted under 35 U.S.C. 154(b) by 0 days.

(21) Appl. No.: 09/373,027

(22) Filed: Aug. 11, 1999

(30) Foreign Application Priority Data

Aug. 12, 1998 (FI) .................................................. 981744

(51) Int. Cl.$^7$ ........................ H04L 25/09; H04L 27/12; H04L 27/120
(52) U.S. Cl. ...................................... 375/295; 375/225
(58) Field of Search ................................ 375/224, 225, 375/259, 260, 262, 265, 295, 302; 714/712; 341/51, 61

(56) References Cited

U.S. PATENT DOCUMENTS

| | | |
|---|---|---|
| 4,973,923 A | 11/1990 | Kuisma ........................ 332/117 |
| 5,091,919 A | 2/1992 | Kuisma ........................ 375/60 |
| 5,124,672 A | 6/1992 | Kuisma ........................ 332/103 |
| 5,231,364 A | 7/1993 | Mucke ........................ 332/105 |
| 5,311,151 A | 5/1994 | Vaisanen ...................... 332/105 |
| 5,357,221 A | 10/1994 | Matero ......................... 332/123 |
| 5,371,481 A | 12/1994 | Tiittanen et al. ............. 332/103 |
| 5,392,460 A | 2/1995 | Mattila et al. ................ 455/76 |
| 5,446,422 A | 8/1995 | Mattila et al. ............... 332/103 |
| 5,448,206 A * | 9/1995 | Newhall ....................... 332/103 |
| 5,469,126 A | 11/1995 | Murtojarvi .................. 332/105 |
| 5,678,224 A | 10/1997 | Murtojarvi ................... 455/326 |
| 5,731,772 A | 3/1998 | Mikkola et al. ............. 341/118 |
| 5,786,780 A * | 7/1998 | Park et al. ..................... 341/47 |
| 5,787,362 A | 7/1998 | Matero ......................... 455/553 |
| 6,115,427 A * | 9/2000 | Calderbank et al. ......... 375/267 |

FOREIGN PATENT DOCUMENTS

| | | |
|---|---|---|
| EP | 0 264 205 A2 | 4/1988 |
| EP | 0 465 144 A2 | 1/1992 |
| EP | 0 828 361 A2 | 3/1998 |
| EP | 0 836 293 A1 | 4/1998 |
| EP | 0 851 620 A2 | 7/1998 |

OTHER PUBLICATIONS

"Interleaving and Decoding Scheme for a Product Code for a Mobile Data Communication", Yi et al., IEEE Transactions on Communications, vol. 45, No. 2, Feb. 1997, pp. 144–147.
"The GSM System For Mobile Communications", Mouly et al., ISBN 2–9507190–0–7, Palaiseau 1992.
Finnish Search Report.
European Standard Search Report.

* cited by examiner

*Primary Examiner*—Jean Corrielus
(74) *Attorney, Agent, or Firm*—Perman & Green, LLP

(57) ABSTRACT

A method is presented for changing data rates in a communication connection between a transmitting device and a receiving device, in which communication connection—the information to be transmitted is in the form of bits grouped to code words and—bits are diagonally interleaved from code words into symbols, a predetermined number of consecutive symbols consituting a burst. The method comprises constructing the symbol according to a predetermined set of rules, wherein said predetermined set of rules are chosen according to the length of the code words.

9 Claims, 7 Drawing Sheets

METHOD AND APPARATUS FOR SEAMLESSLY CHANGING THE RADIO INTERFACE DATA RATE IN CIRCUIT SWITCHED TRANSMISSION

TECHNOLOGICAL FIELD

The invention concerns generally the technology required for changing the data rates during an active connection between a base station and a mobile station in a radio communications system. Especially the invention concerns a situation where the code rate and/or the modulation method is changed.

BACKGROUND OF THE INVENTION

EDGE or "Enhanced Datarates for GSM Evolution", where GSM stands for "Global System for Mobile telecommunications", is an international project where means are developed for providing users with higher data rates in a telecommunications system based on known GSM technology. The raw bit rate at the GSM air interface between a base station and a mobile station is 22.8 kbit/s. Channel coding and the overheads associated thereto lower the usable data rate so that data rates from 3.6 to 14.5 kbit/s are available to connected data applications. Even these rates carry a certain overhead on top of the available user data rate. At the time of filing this patent application EDGE aims at a raw air-interface bit rate of 69.2 kbit/s. The enhancement in data rates is largely due to the 8PSK (8-level Phase Shift Keying) modulation method which is employed in EDGE, in contrast to the GMSK (Gaussian Minimum Shift Keying) modulation used in GSM.

It is expected that EDGE connections will not be supported throughout a cellular network. EDGE connections will most probably be available only in central areas like office buildings and densely trafficated business centres. To take advantage of the full capability of the system a mobile station must therefore support both the advanced EDGE data rates and the conventional GSM data rates. A mechanism must thus be developed for changing between the two. In EDGE, the concept of link adaptation has been defined. It comprises all means of changing the radio interface data rate during an active connection by changing the modulation method or also by changing the amount of employed channel coding. The latter may be varied to compensate for changes in the quality of the radio environment. There exists a risk that link adaptation will cause perceivable artefacts, like clicks or silent periods in an audio communication or blank or distorted pixels or fields in a video communication. It is naturally desirable that a user will not be able to perceive an executed link adaptation command by just observing the results (sound, picture etc.) of the communication. A seamless change in the radio interface data rate is defined to be a link adaptation operation which goes totally unnoticed by the user.

As a background for the invention, the transmission chain used in the conventional GSM system will be briefly discussed with reference to FIG. 1. The transmission of full-rate speech is used here as an example of a typical service requiring a circuit-switched connection. Speech recorded by a microphone 101 will first be encoded in a speech encoder 102 which converts an analogue speech signal into digital form and performs a group of encoding operations. The output signal of the speech encoder has a rate of 13 kbit/s and consists of blocks of 260 bits, the blocks following each other at an interval of 20ms. The channel encoder 103 introduces redundancy into this data flow, increasing its rate by adding into it information calculated from the contents of the blocks. The reason for channel coding is to allow the detection or even the correction of signal errors introduced later during transmission. The output of the channel encoder 103 consists of code words of 456 bits each. Exactly one code word is produced from each block of input information for the channel encoder.

The code words that come from the channel encoder 103 are input to the interleaver/burst formatter 104 for mixing up the bits of several code words in a predetermined fashion and organising them into bursts. The aim of interleaving is to decorrelate errors that will potentially occur in the transmission so that the resulting erraneous bits will be distributed into essentially randomised positions in several code words instead of corrupting a sequence of successive bits in a single code word. Most interleaving methods that are currently used are diagonal, meaning that bits from consecutive code words are cross-distributed so that certain bits of the later codeword come earlier in the interleaved data stream than certain other bits of the former codeword. In GSM, the bits from a certain code word are spread over a period of 22 bursts, and a single burst may contain bits from as many as five different code words. The interleaving details of GSM depend on the nature of the information to be interleaved (speech, data, access request etc.)

The burst formation part of the interleaver/burst formatter 104 takes a block of 116 interleaved bits and adds three zero bits (called the tail bits) at the beginning and end of the block as well as a so-called training sequence of 26 bits exactly in the middle of the block. At the output of the interleaver/burst formatter 104 the flow of information consists of formatted blocks known as bursts. For the description to be consistent throughout this patent application, the bits of a GSM burst will be called symbols in the following. Additionally the burst will be denominated as a digital burst while it is still in digital form. Each digital burst thus comprises 114 symbols of coded data and 2 so-called stealing flag symbols that indicate whether the coded data symbols include user data or signalling data belonging to a certain Fast Associated Control Channel (FACCH). Additionally each digital burst comprises the above-mentioned 3+3 tail symbols and the training sequence of 26 symbols.

The ciphering block 105 performs a logical exclusive-or operation between the coded data symbols of a digital burst and a certain pseudo-random bit sequence in order to impede the unauthorised reception of the transmitted data. The tail symbols, the stealing flag symbols and the training sequence are not ciphered. After ciphering the digital bursts are input into a modulator/upconverter 106 that transforms each digital burst into a sequence of a radio-frequency analogue oscillating signal, which is amplified in an amplifier 107 and conducted into an antenna 108 for transmission. Because of its close connection with the digital burst, the analogue signal sequence is also known as a burst; for clarity it can be further specified as a transmission burst. Several filtering operations take place inside the modulator/upconverter 106 and between it and the antenna 108; for graphical clarity the respective filter blocks are omitted from FIG. 1. In GSM a Time Division Multiple Access (TDMA) scheme is applied, in which each speech channel may use a single time slot in a cyclically repeated frame of eight consecutive time slots. The transmitter transmits one transmission burst in each time slot during the active connection.

A receiver chain for receiving, demodulating and decoding the data transmitted by the transmission chain of FIG. 1 would consist of a receiving antenna for receiving the radio signal, some filters and amplifiers for filtering and amplifying the received signal, a downconverter/demodulator or an equalizer for converting the transmission burst into digital form on baseband frequency, a deciphering block for converting the ciphered bits into plain data, a burst deconstructing/de-interleaving block for exctracting the data bits and removing the interleaving, a channel decoder for removing the channel coding, and a speech decoder/D/A converter for converting the decoded digital signal into an analogue signal from which the original speech may be reproduced by a loudspeaker. The operation of the blocks in the receiver chain is approximately the inverse of that of the respective blocks in the transmitter chain.

Minor changes are required in the above-explained functions of the transmission and reception chain blocks for other transmission modes than full-rate speech. These changes are known to the person skilled in the art from the GSM specifications published by ETSI (European Telecommunications Standards Institute) and e.g. from the book Michel Mouly, Marie-Bernadette Pautet: "The GSM System for Mobile Communications", published by the authors, ISBN 2-9507190-0-7, Palaiseau 1992.

The transmission chain of FIG. 1 is basically applicable also for EDGE transmissions, although the use of higher data rates would necessitate changes in the function of the blocks. Data requiring a higher data rate would most probably originate from a different source than a microphone and a speech encoder, for example a camera and a video encoder. The channel encoder block would operate according to the EDGE channel encoding scheme and, together with the interleaver/burst formatter, ciphering block and the modulator part of the modulator/upconverter, it would have to operate much faster than in basic GSM. The channel encoder block would also be capable of changing the amount of applied channel encoding according to link adaptation commands.

The most radical difference would result from the different modulation method. In the 8PSK modulation scheme of EDGE, three consecutive bits in the formatted digital burst are mapped onto one transmission symbol. For this reason already a symbol in the digital burst is said to consist of a group of three consecutive bits instead of one bit as in GSM. FIG. 2 illustrates the mapping principle. A transmission symbol is a sequence of an oscillating analoque signal with constant amplitude and frequency and with a phase of $i(\pi/4)$ radians, where i takes an integral value from 0 to 7 depending on the values of the three bits to be mapped. Dots in the phase diagram of FIG. 2 mark the allowed end positions in the complex plane for the vector representation of the analogue signal $\phi$. The axes are the real part $Re(\phi)$ and the imaginary part $Im(\phi)$ of the signal. During the transmission of a burst, the transmitter will produce transmission symbols with the instantaneous rate of 270 ksymbols/s, which is the same as in GSM; the difference in performance results from the fact that an 8PSK symbol carries the information equivalent to three bits, whereas in GMSK each symbol only corresponds to one bit.

The problem concerned by the present invention arises when the applied modulation method is abruptly changed from GMSK to 8PSK or vice versa, and/or when the amount of applied channel coding is abruptly changed. If the transmitter waits until the end of the current interleaving period before commissioning the change, there will be a time interval with practically no transmitted data and consequently a blackout in the circuit-switched communications service. The end of the current interleaving period is defined as the moment when all such interleaved bits have been transmitted that were encoded using the "old" channel encoding method and/or modulated using the "old" modulation method. The nature of interleaving states that towards the end of such interleaving period the transmitted bursts will be mostly empty. The same applies to the beginning of the first interleaving period with the "new" channel encoding and/or modulation.

SUMMARY OF THE INVENTION

It is therefore an object of the present invention to present a method for changing between modulation and/or channel encoding methods in a way that eliminates the silent period or seam caused by interleaving in prior art solutions. It is also an object of the present invention to present suitable transmitter and receiver apparatuses for performing the method of the invention.

The objects of the invention are fulfilled by applying the same interleaving order regardless of channel encoding and modulation, and by always using the higher-order modulation during a certain transition period between two differently ranked modulation methods.

The method according to the invention is characterised in that it comprises the steps of
   a) for the construction of a certain symbol, finding the code words the bits of which have influence on the content of the symbol under construction and
   b) constructing the symbol under construction according to a predetermined formula,
wherein said predetermined formula is chosen according to the length of the code words the bits of which have influence on the content of the symbol under construction.

The transmitter according to the invention is characterised in that it is arranged to operate according to said method.

The receiver according to the invention is characterised in that it is arranged to operate according to said method.

According to the invention the interleaving operation is defined so that each symbol in a digital burst to be formatted has an unambiguously defined origin among the bits of the code words irrespective of the lengths of the code words. In a link adaptation operation where the length of the code words changes, the interleaver/burst formatter of the transmitter produces each symbol according to a specific rule that depends on the length of the code word where the origins of the symbol are. As a consequence, the bits from consecutive code words may be interleaved and mapped into the symbols of the digital bursts regardless of the amount of applied channel coding.

A change in modulation order, accompanied by the regularly continuing interleaving explained above, will result in a transition period during which a transmission burst will contain some previously diagonally interleaved symbols that were, at the time of their generation, meant to be transmitted with the old modulation method. The rest of the symbols in these transmission bursts have been generated for transmission with the new modulation method. According to the invention the higher-order modulation method will be used for transmitting each whole burst containing symbols that were generated for transmission with the higher-order modulation method. Some symbols that were generated for transmission with the lower-order modulation method will thereby be transmitted with the higher-order modulation method, but this does not cause significant disadvantages.

In EDGE, a communications service may have at its disposal more than one time slot in a frame. A change in modulation order will necessitate a change in the number of used time slots, if it is not accompanied with a simultaneous change in the amount of channel coding that would compensate for the growing/decreasing need for transmission time at the radio interface. For example a 28.8 kbps service may first have one 28.8 kbps slot with 8PSK modulation, and after the change two 14.4 kbps slots with GMSK modulation, or vice versa. During a transition period the service may have two time slots in a frame at its disposal, and two consecutive transmission bursts to be transmitted, the transmission bursts being a "8PSK-burst" and a "GMSK-burst". Of these, the former is a burst containing some symbols generated for transmission with 8PSK and interleaved among a number of symbols generated for transmission with GMSK. The latter is a burst containing only symbols generated for transmission with GMSK. The most advantageous solution, from the point of view of radio network performance, would be to transmit the "8PSK-burst" with 8PSK in the first available time slot of the frame and the "GMSK-burst" with GMSK in the second available time slot of the frame. However, this would require the transmitter to change modulation between two consecutive time slots in a frame, which set rather hard requirements for the operation of the transmitter. The operational requirements may be considerably eased by allowing for the transmission of all transmission bursts in the available time slots in a frame with the higher-order modulation method whenever there is at least one "8PSK-burst" to be transmitted in that frame.

The invention has been described above exclusively with references to EDGE, GSM, 8PSK and GMSK. However, it is clear to the person skilled in the art that the invention is not in any way limited to these particular definitions but it can be applied in all radio communications systems where a change between modulation methods of different orders and/or a change in the amount of applied channel coding is allowed during an active connection, and where diagonal interleaving is employed.

The invention provides for seamless transition between modulation methods and between various amounts of applied channel coding, which was the object set for the invention.

BRIEF DESCRIPTION OF DRAWINGS

The novel features which are considered as characteristic of the invention are set forth in particular in the appended Claims. The invention itself, however, both as to its construction and its method of operation, together with additional objects and advantages thereof, will be best understood from the following description of specific embodiments when read in connection with the accompanying drawings.

FIGS. 1 and 2 were referred to in the discussion of prior art, so the following description of the invention will mainly concentrate on FIGS. 3 to 8.

DETAILED DESCRIPTION OF THE INVENTION

If we assume a system where two alternative modulation methods are available, the methods being compatible in symbol rate but of different order (like the GMSK of GSM and the 8PSK of EDGE), we can distinguish between the following four cases:

1) higher order modulation in use, code rate in channel encoding changes,
2) lower order modulation in use, code rate in channel encoding changes,
3) modulation changes from higher to lower order, or
4) modulation changes from lower to higher order.

Any one of the cases may or may not be accompanied with a change in the amount of available radio resources, for example the number of available time slots in a TDMA frame. In cases 1 and 2, a change in the code rate will increase or decrease the relative portion of transmission overhead caused by channel coding. If the amount of available radio resources does not change accordingly at the same time, a corresponding decrease or increase in effective user data rate is likely to follow. However, for example a more intensive channel coding scheme will probably increase the relative portion of successfully (flawlessly) transmitted data frames, which will compensate for the user data rate change especially in systems where rapid retransmission of corrupted frames is in use. The same applies in cases 3 and 4, although the cause for the decrease or increase in effective user data rate comes from the change of modulation method. A simultaneous change in the amount of channel coding may naturally accompany a change of modulation method.

Cases 1 and 2 are dealt with first. We will assume that the change in code rate will not (significantly) affect the number of bits in a code word, whereby specific rules may be applied in the interleaving procedure to avoid a period of no transmitted data.

Figure 1:
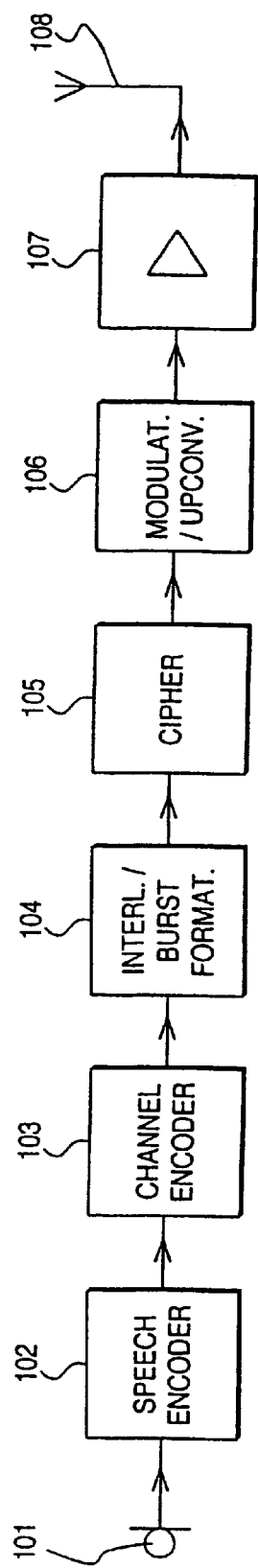
FIG. 1 illustrates a known transmission chain in a transmitter.
Figure 2:
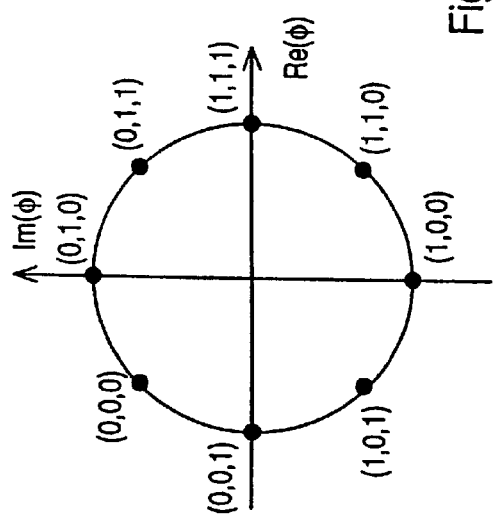
FIG. 2 illustrates the principle of 8PSK modulation.
Figure 3:
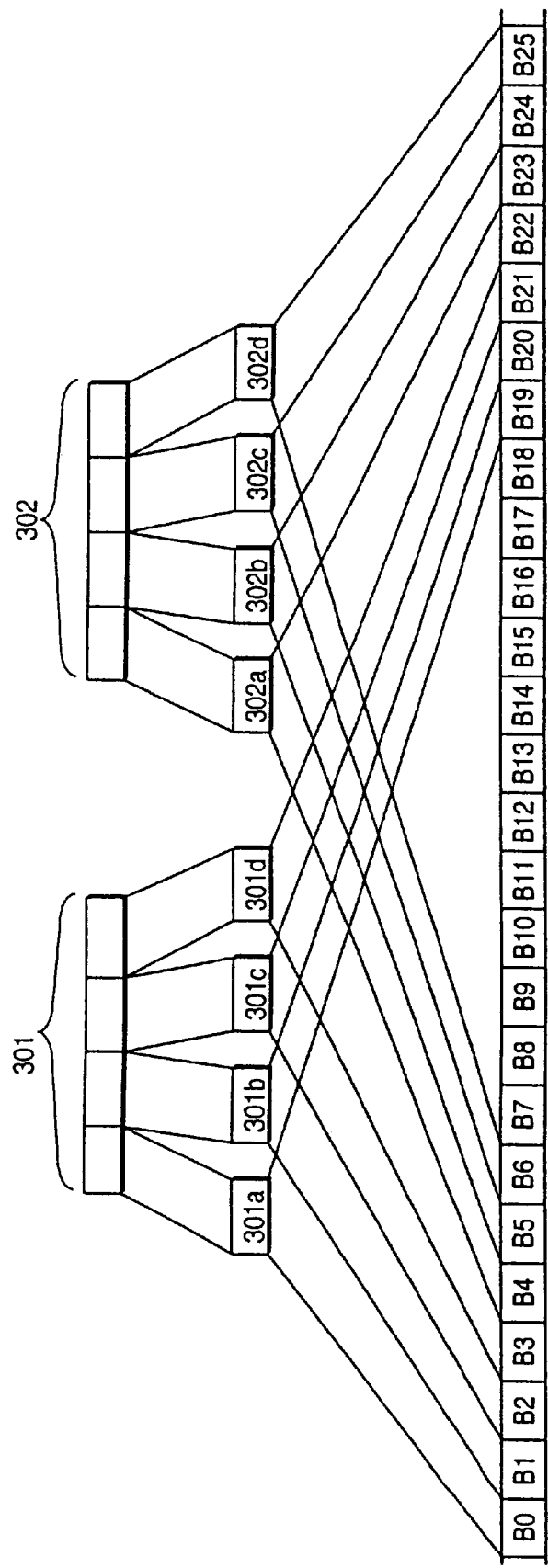
FIG. 3 illustrates the aspects of diagonal interleaving.

FIG. 3 illustrates the principle of one specific diagonal interleaving scheme according to a preferable embodiment of the invention. Here we assume a one-to one relationship between an interleaved bit and a symbol in a digital burst. At the top of the figure there are two consecutive code words 301 and 302. For the figure to be applicable in the context of the present invention, it will be assumed that code word 301 has been produced with a first channel coding procedure, having a first code rate, and code word 302 has been produced with a second channel coding procedure, having a second code rate which is different than said first code rate. For compatibility with the GSM system, it is also assumed that the each code word consists of 456 bits. The compatibility with GSM is for example only and does not limit the applicability of the invention.

The interleaving starts by dividing each code word into four quarters 301a–301d and 302a–302d, each quarter consisting of 114 consecutive bits from the original code word. The bits from each quarter are then distributed into a plurality of digital bursts. The 26 digital bursts that will receive the bits from the code word quarters 301a–301d and 302a–302d appear at the bottom of FIG. 3 and carry the reference designators from B0 to B25. The lines connecting the quarters to the digital bursts show into which bursts the bits of each code word will be disposed. To be exact, the correlation between code word quarters and digital bursts of FIG. 3 conforms to the following table.

| The bits from quarter . . . | . . . go into bursts no. |
|---|---|
| 301a | B0 to B18 |
| 301b | B1 to B19 |
| 301c | B2 to B20 |
| 301d | B3 to B21 |
| 302a | B4 to B22 |
| 302b | B5 to B23 |
| 302c | B6 to B24 |
| 302d | B7 to B25 |

Inside the digital bursts the positioning of the bits follows a certain location table, which determines exactly, which bit takes which symbol position. As an example, the origin of the first 25 symbols of burst B18 are given in the following table. Column B shows the burst number (which is 18 for all bits of B18) and column j shows the running number of the symbol inside the burst. Column n shows the designator of the code word where that bit originates from which will become that particular symbol. Some arbitrary numbering of code words from N to N+4 has been assumed. Column k shows the running number of the bit inside the code word where it originates from.

| B | j | n | k |
|---|---|---|---|
| 18 | 0 | N + 4 | 228 |
| 18 | 1 | N + 4 | 210 |
| 18 | 2 | N + 4 | 78 |
| 18 | 3 | N + 3 | 402 |
| 18 | 4 | N + 3 | 270 |
| 18 | 5 | N + 3 | 138 |
| 18 | 6 | N + 3 | 6 |
| 18 | 7 | N + 2 | 444 |
| 18 | 8 | N + 2 | 312 |
| 18 | 9 | N + 2 | 180 |
| 18 | 10 | N + 2 | 48 |
| 18 | 11 | N + 1 | 372 |
| 18 | 12 | N + 1 | 240 |
| 18 | 13 | N + 1 | 222 |
| 18 | 14 | N + 1 | 90 |
| 18 | 15 | N | 414 |
| 18 | 16 | N | 282 |
| 18 | 17 | N | 150 |
| 18 | 18 | N | 18 |
| 18 | 19 | N + 4 | 247 |
| 18 | 20 | N + 4 | 115 |
| 18 | 21 | N + 4 | 97 |
| 18 | 22 | N + 3 | 421 |
| 18 | 23 | N + 3 | 289 |
| 18 | 24 | N + 3 | 157 |

For the realisation of the interleaving operation the transmitting device must comprise a memory block called an interleaving buffer. It is a "circular" memory having as many memory locations as there are code words from which bits are taken during an interleaving operation. Writing a new code word into the interleaving buffer simultaneously erases the oldest code word in the buffer.

According to the invention the interleaving of bits from the code words into the symbols of the digital bursts does not depend on link adaptation. In other words, no matter what amount or type of channel coding was used to produce the code words 301 and 302 of FIG. 3, the distribution of their bits into the digital bursts B0 to B25 follows always the same rules. To conform with the above-presented assumption for constant code word length there may be needed some additional padding bits in the code words to make them always equal in length. Hence the definition above that the change in code rate will not "significantly" affect the number of bits in a code word: small changes in the number of actual encoded data bits may be masked with the use of padding bits. Conceptually it is easiest to account for the addition of padding bits as a part of the channel coding operation.

The invention is naturally insensitive to the specific scheme that is used for channel coding and interleaving. However, for example in the case of enhancing the operation of an existing system (the GSM) with new functionalities (the EDGE) it is most advantageous to take the interleaving schemes directly from the specifications of the existing system. The interleaving schemes of GSM are, as previously mentioned, known to the person skilled in the art from the GSM specifications published by ETSI. Specifically the GSM spesifications number TS GSM 05.01, TS GSM 05.02, TS GSM 05.03, TS GSM 05.04, TS GSM 05.05, TS GSM 05.08, TS GSM 05.10 and TS GSM 04.03 deal with the channel coding, interleaving, ciphering and modulation issues. New channel coding schemes that work well with the invention are for example turbo coding and serial concatenated coding.

Figure 4:
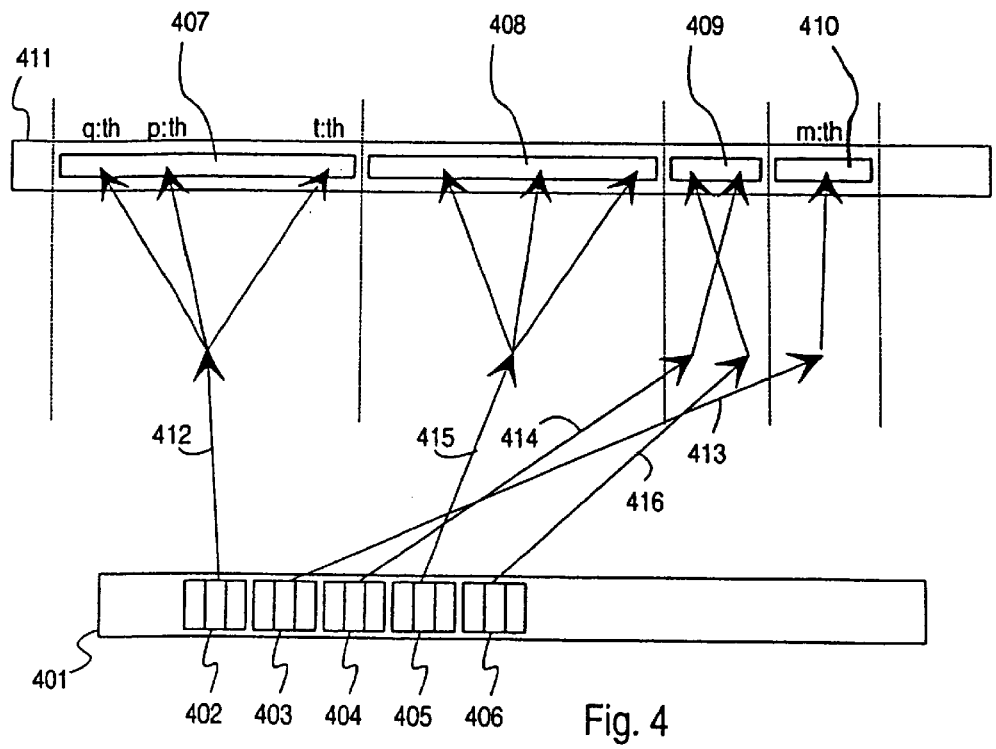
FIG. 4 illustrates diagonal interleaving of code words of different length.

FIG. 4 illustrates a generalisation of the principle of diagonal interleaving that follows always the same rules irrespective of changes in code word structure. A digital burst 401 is shown to consist of symbols, of which the symbols 402, 403, 404, 405 and 406 are separately shown. The digital burst may principally contain any number of symbols. Each symbol consists of s bits (here s=3). Each symbol has its origin somewhere among the code words to be interleaved. Code words 407, 408, 409 and 410 are separately shown; for the interleaving they have been temporarily stored in an interleaving buffer 411. The interleaving buffer may house any number M of code words, where M is conventionally a system constant. It can also be a parameter the value of which must be negotiated between the transmitting and receiving devices. The length of the code words is limited between a minimum length and a maximum length. In a typical link adaptation case the first M' code words in the interleaving buffer are of a first length and the rest (M–M') code words in the interleaving buffer are of a second length. However, the invention works equally well even in a situation where each code word in the interleaving buffer has a different length. In FIG. 4, the code words 407 and 408 have a first length and the code words 409 and 410 have a second length which is one third of said first length.

The unambiguous relation between each symbol in the formatted digital burst and the contents of certain code word(s) in the interleaving buffer can be defined in various ways. In the embodiment of FIG. 4 each symbol has its origin in exactly one code word in the interleaving buffer, and the definition of the unambiguous relation has two steps:

which code word is the origin for the contents of the symbol, and depending on the length of that particular code word, which bits in the code word have influence on the value of the symbol.

In FIG. 4, symbol 402 is defined to have its origin within code word 407, symbol 403 has its origin within code word 410, symbols 404 and 406 have their origins within code word 409 and symbol 405 has its origin within code word 408. These definitions have their graphical representations in FIG. 4 as arrows 412, 413, 414, 415 and 416. When formulating symbol 402, the interleaver/burst formatter knows (or finds out) that code word 407 has said first length. It applies the following exemplary rules:

take the q:th, p:th and r:th bit of code word 407, where q, p and r are positive integers smaller than or equal to the number of bits in code word 407 and depend on the symbol that is being formulated, and insert said bits in said order as the value for symbol 402.

When formulating symbol 403, the interleaver/burst formatter knows or finds out that code word 410 has said second length. It applies the following exemplary rules:

if the m:th bit of code word 410 is '1', where m is a positive integer smaller than or equal to the number of bits in code word 410 and depends on the symbol that is being formulated, the value for symbol 403 will be some first predetermined three-bit pattern, e.g. '001', if the m:th bit of code word 410 is '0', the value for symbol 403 will be some second predetermined three-bit pattern, e.g. '111'.

The most straightforward way of linking the two rule sets together is to choose q=m, p=m+1 and r=m+2. In other words, if the code word is of the first length (which was above defined to be three times the second length), divide it into consecutive groups of three bits and treat each group in the same way as a single bit in a code word of the second length. However, this will result in one symbol of the digital burst representing three consecutive data bits, so if an error occurs during transmission, three consecutive data bits become unreliable. It is more advantageous to choose the numbers q, p and r so that they differ remarkably from each other.

Figure 9:
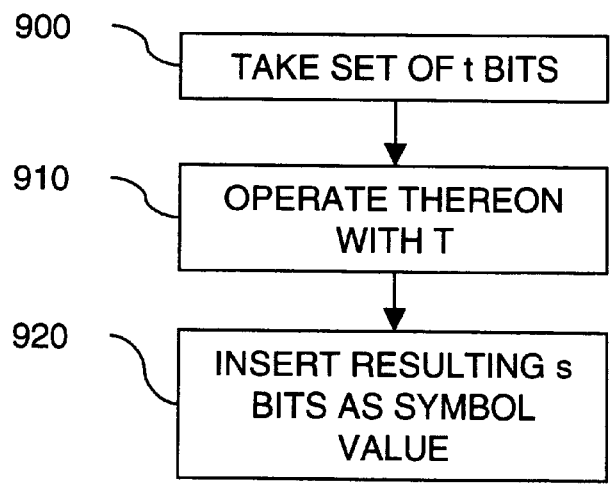
FIG. 9 illustrates a method of constructing a symbol according to an embodiment the present invention.

Referring to FIG. 9, similar rules are easily defined for each possible code word lengths. A general definition for such rules could be devised as follows:

take a set of t bits from the code word(s), where t is larger than or equal to zero and smaller than or equal to the number s of bits in a symbol as shown in block 900, operate on said set of t bits with a known operator T, which may depend on the length of the code word and include any combination of identity operation, order change, duplication, inversion, mapping or addition of bits, and which produces as a result a set of s bits as shown in block 910, and insert the resulting s bits as the value of the symbol that is formulated as shown in block 920.

For example, for code words having enough bits to fill all bit positions in the symbols to be constructed, the operator T consists of arranging the bits from the code words into the bit positions of the symbols in a predetermined order, and for code words not having enough bits to fill all bit positions in the symbols to be constructed, the operator T consists of mapping a number of first predetermined bit patterns in the code words into a number of predetermined bit patterns in the bit positions of the symbol.

Figure 11:
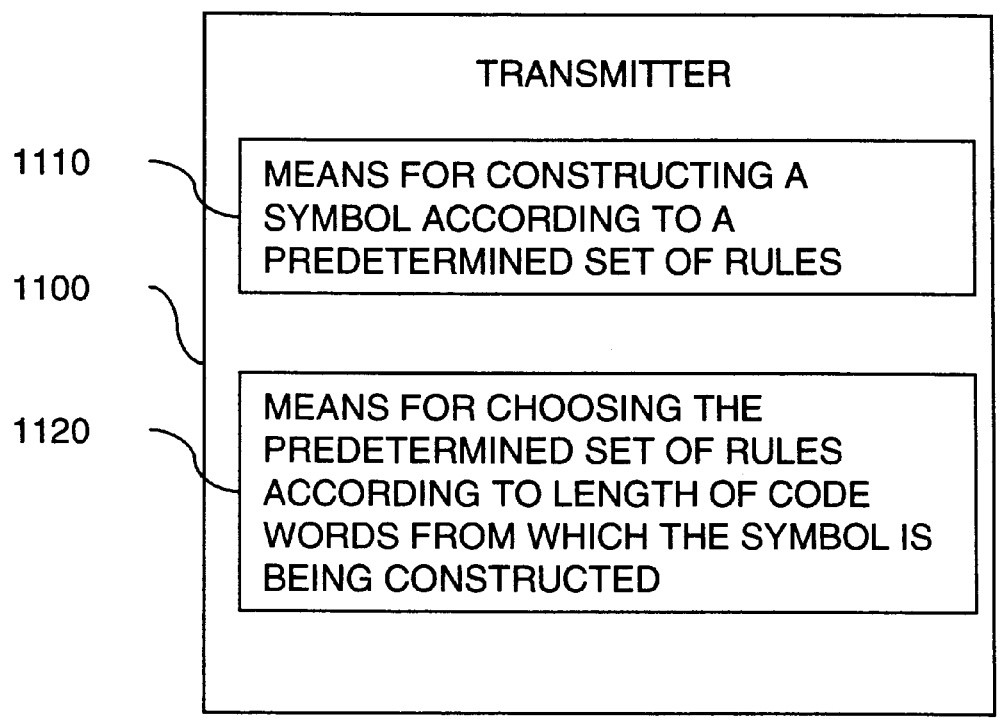
FIG. 11 illustrates a transmitter for transmitting information in an embodiment of a communication connection of the present invention.

FIG. 11 shows a transmitter 1100 for transmitting symbols according to some of the above mentioned rules. Transmitter 1100 includes means 1110 for constructing a certain symbol according to a predetermined set of rules, and means 1120 for choosing the predetermined set of rules according to a length of code words from which the certain symbol is being constructed.

If the interleaving operation is not to add any redundancy into the transmitted information, taken together the rules must define a bijection between the bits in the code words and the symbols in the digital bursts. This means that every bit in the code words has a respective symbol in one of the digital bursts, the contents of which it has an effect upon, but there are no bits in the code words that would affect the contents of more than one symbol. This is not a limiting feature of the invention: if every code word in the interleaving buffer does not have the maximum length, the invention allows for some bits in the code words to affect the contents of more than one symbol in the digital bursts.

It is important to understand that the exact rules given above are for example only and they do not limit the invention. Especially the three-bit combinations that are used above to represent a single bit from a short code word allow for any arbitrary definition. The rules for defining the contents of a symbol are simplest when each symbol has its origin in exactly one code word. However, the invention makes it principally possible that the contents of a symbol may depend on bits in two or more code words. Some symbols in a digital burst may have a constant value; this applies especially to the tail bits and the training sequence. Changes departing from the known interleaving schemes of existing digital cellular radio networks are possible, although they would make it more difficult to introduce the new systems because they could not take as much advantage of the existing infrastructure.

It is possible to integrate a ciphering operation as a part of the interleaving/burst formatting procedure by including it into said operator T. For example an exclusive-or operation between the bits in said set of t bits and some corresponding bits from a pseudo-random bit sequence would work well. This would eliminate the need for a separate ciphering block between the interleaver/burst formatter and the modulator in a transmission chain.

In order not to destroy information, the maximum code word length, the rate of producing the code words, the length of the digital burst, the number s of bits in a symbol and the rate of producing the digital bursts must be coordinated so that even if all code words are of the maximum length, all their bits will find their way into the symbols with no bits left over. This subject will be revisited later in the description of changes in modulation order.

Next, the problems associated with a change in modulation method (cases 3 and 4 above) will be dealt with. Let us assume that a command has been issued for changing the modulation from the higher order method to the lower order method, as in case 3 above. Let us further assume that the modulation methods are 8PSK and GMSK, and that simultaneously the amount of available radio resources increases so that no changes are caused to the effective user data rate. Let us specifically assume that the number of available time slots in a TDMA frame will increase from one to two. This corresponds to the number of allocated traffic channels (TCHs) increasing from one to two. Before the change there was one time slot in the TDMA frame allocated to the connection in question, said time slot being designated as an 8PSK time slot and carrying an 8PSK-modulated traffic channel. After the change there will be two allocated time slots, both of them designated as GMSK time slots and each one of them carrying a GMSK-modulated traffic channel. It is on the responsibility of the transmitting device to direct the generated user information into the two available channels in an optimal way. Similarly it is on the responsibility of the receiving device to know or to find out, which is said optimal way applied by the transmitting device, whereby the receiving device is able to reconstruct the information transferred along the two parallel channels.

For using two or more allocated traffic channels simultaneously the transmitting device must have a separate channel encoder and an interleaver/burst formatter for each allocated traffic channel. The generated user information is directed into the two parallel channel encoders according to some alternating order which is of no importance to the present invention. Each channel encoder is followed by its own interleaver/burst formatter, so when for example two traffic channels are in use, two parallel interleaving procedures according to FIG. 3 and/or FIG. 4 take place, producing two parallel trains of digital bursts. Each train of digital bursts is directed to its own slot in the TDMA frames.

The command for commencing the use of the lower-order modulation method will include an indication from which moment it will be effective. Regarding FIG. 3 we may suppose that code word 301 is still meant to be transmitted with the higher-order modulation method, whereas code word 302 is meant to be transmitted with the lower-order modulation method, i.e. the command for changing modulation method is effective from code word 302 onwards. The diagonal interleaving scheme gives rise to a situation where digital bursts B0, B1, B2 and B3 contain only "old" symbols derived from the code words that were meant to be transmitted with the higher-order modulation method, code word 301 being the last of them, digital bursts B22, B23, B24 and B25 contain only "new" symbols derived from the code words that were meant to be transmitted with the lower-order modulation method, code word 302 being the first of them, and digital bursts from B4 to B21 are a mixture of "old" and "new" symbols derived from code words that were meant to be transmitted with both modulation methods.

The mixing of "old" and "new" bits takes place only in one of the interleaver/burst formatter blocks that operate parallelly after the change, because before the change there was only one channel available and correspondingly only one of the interleaving buffers contains "old" code words.

Figure 10:
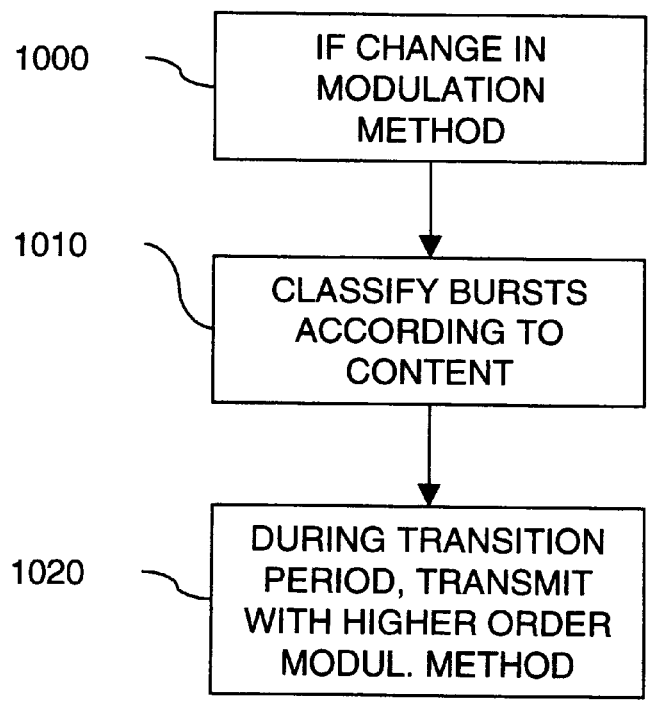
FIG. 10 illustrates a method of changing a modulation method according to an embodiment of the present invention.

In FIGS. 4 and 10, the exemplary situation discussed above corresponds to a situation where code words 407 and 408 are "old" code words meant to be transmitted with the higher-order modulation method, code words 409 and 410 are "new" code words meant to be transmitted with the lower-order modulation method and digital burst 401 is one of the digital bursts that are a mixture of "old" and "new" symbols.

The procedure according to the invention is easily recognised from FIGS. 4 and 10. When a command is received for changing the modulation method (block 1000), the bursts may be classified according to bit content (block 1010). As long as there are "old" code words in the interleaving buffer (the "transition period"), the digital bursts must conform to the structure required by the higher-order modulation method (block 1020), where each symbol consists of as many bits as the modulation method states, (here three, according to 8PSK). If the burst structure were changed into the less-bits-per-symbol type of the lower order modulation method (here the one-bit-per-one-symbol of GMSK), it would be impossible to map the three-bit combinations of the longer "old" code words into one symbol without losing information. During the time for which there are both types of code words in the interleaving buffer the interleaver/burst formatter handling that buffer must always map a single bit from a "new" code word into a three-bit symbol in a digital burst.

The digital burst structure of the higher-order modulation method must thus be used in one of the parallel channels until the last "old" code word has been erased from the interleaving buffer of that channel. In the exemplary situation discussed here it will result in a transition period during which there are two parallel channels in the transmitting device, one of them producing a train of 8PSK digital bursts and the other producing a train of GMSK digital bursts. In order to get all information transmitted within the allocated time slots the transmitter must keep using 8PSK modulation in one of the time slots available after the change until all such bursts have been transmitted that contain information originating from the "old" code words. Thereafter it may switch to one-bit-to-one-symbol interleaving, GMSK burst structure and GMSK modulation also on that channel.

Figure 5:
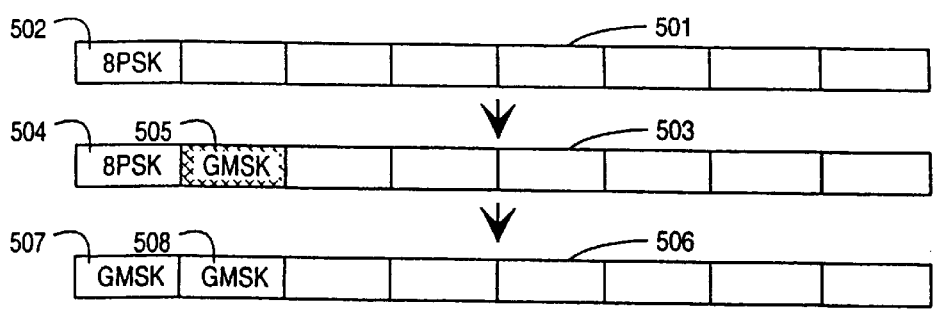
FIG. 5 shows the transition from one higher-order time slot to two lower-order time slots.

FIG. 5 illustrates the transition from one-slot 8PSK to two-slot GMSK discussed above. Frame 501 is a TDMA frame before the change, in which time slot 502 is an 8PSK time slot allocated for the connection in question. During the transition period the frame structure conforms advantageously to frame 503, where time slots 504 and 505 have been allocated, one of them being an 8PSK time slot and the other being a GMSK time slot. After the transition period the frame structure conforms to frame 506, where to GMSK time slots 507 and 508 have been allocated.

Usually less transmission power is required to transmit reliably with GMSK than to transmit reliably with 8PSK. The above-explained procedure is thus optimal from the radio network performance point of view: GMSK is used whenever possible and correspondingly the interference caused to other simultaneous connections is kept at minimum. However, it may prove to be difficult and/or unnecessarily power-consuming to change modulations between successive time slots in a mobile station of a cellular radio network. Another embodiment of the invention is therefore such where during the transition period the transmitting device keeps using the higher-order modulation in each allocated time slot as long as there is, at least in one interleaving buffer, untransmitted information that requires the use of higher-order modulation in the channel associated with said at least one interleaving buffer. This possibility is illustrated in FIG. 5 by the hatching of time slot 505. Naturally the use of higher-order modulation in all time slots dictates that the digital burst structure of the higher-order modulation method must be used in all parallel channels, together with the required bit-to-symbol mapping operations, even if there are only "new" code words in the respective interleaving buffers.

Using "unnecessarily" 8PSK in some time slots will slightly increase the overall interference level in the network. However, the additional interference will only appear during the time of one interleaving period, which is typically in the order of tens or hundreds of milliseconds.

Next we will assume that a change from a lower-order modulation method (GMSK) to a higher-order modulation method (8PSK) is performed, as in case 4 mentioned above. We will also assume that the number of available time slots in a TDMA frame will simultaneously decrease from two to one. This corresponds to the number of allocated traffic channels (TCHs) decreasing from one to two. Before the change there were two time slots in the TDMA frame allocated to the connection in question, said time slots being designated as a GMSK time slots and carrying one GMSK-modulated traffic channel each. After the change there will be only one allocated time slot, designated as an 8PSK time slot and carrying an 8PSK-modulated traffic channel.

In the transmitting device the change means that the parallel use of two channel encoders, interleaver/burst formatters and modulators will end and operation will continue with only one transmission branch. During a transmission period there will be a decreasing number of short GMSK code words in each of the two parallel interleaving buffers. In one of them, the number of long 8PSK code words will simultaneously increase he other interleaving buffer is sequentially filled with nul code words. In the former, in order not to destroy any information, it is important to start using the digital burst structure according to 8PSK at once when the first long 8PSK code word appers in the interleaving buffer. Correspondingly the rules of mapping the single bits from the remaining short GMSK code words into the three-bit symbols of the 8PSK digital burst will apply. In the latter, it is possible to use the GMSK digital burst structure until the interleaving buffer is empty and the use of that transmitting branch is discontinued. However, as described below, it may be advantageous to switch to the 8PSK digital burst structure also in the "dying" channel for the rest of the time.

Figure 6:
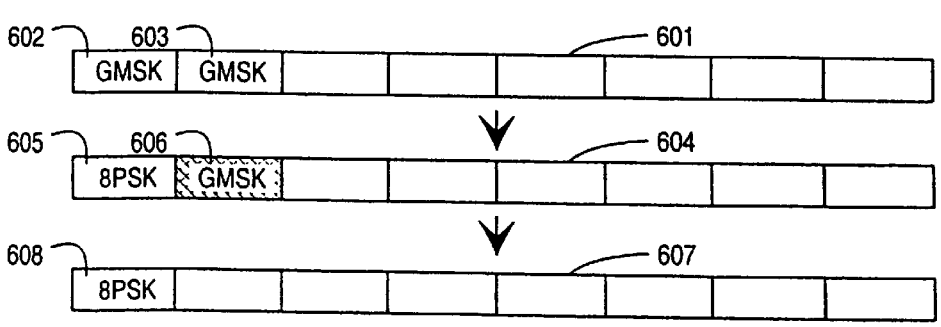
FIG. 6 shows the transition from two lower-order time slots to one higher-order time slot.

FIG. 6 illustrates the allocation of time slots in the above-explained situation where the modulation is changed from GMSK to 8PSK. Before the change the allocation of time slots is as in frame 601, where two GMSK time slots 602 and 603 are allocated. During the transition period when there are still GMSK code words in the interleaving buffers, the allocation structure of frame 604 applies with one allocated 8PSK time slot 605 and one allocated GMSK time slot 606. After the transition period there is only one allocated 8PSK time slot 608 as in frame 607. Also here it may be advantageous from the mobile station operation point of view that same modulation (8PSK) would be used in both allocated time slots during the transition period, hence the hatching in time slot 606. This will again require that the "dying" channel will switch into the 8PSK digital burst structure for the duration of the transition period.

The invention does not require that the number of available channels (the number of allocated time slots in a frame) should change in association with a change in the applied modulation method. If the number of channels does not change, there will be no problem in whether or not to use "unnecessarily" the higher-order modulation method and the associated digital burst structure and mapping rules also in a channel where only code words associated to the lower-order modulation method are handled. During the transition time the higher-order modulation method will always be used.

In the foregoing it has been exclusively assumed that at least one of the time slots that were allocated to the connection in question will be reused after the change in modulation method. The invention is not limiting in this respect. The allocation of time slots may vary, if the operation of the transmitting device and receiving device otherwise permit it. Also the invention does not require that when more than one time slot have been allocated, the allocated time slots should be adjacent to each other in the TDMA frame. Further, the invention is not limited to changes from one allocated time slot to two allocated time slots or vice versa. In addition to those already described, another typical change in modulation methods and time slot allocations could be a change from one 28.8 kbps 8PSK time slot to three 9.6 kbps GMSK time slots or vice versa. Other possibilities include a change between two 14.4 kbps GMSK time slots and three 9.6 kbps GMSK time slots in either direction.

An interesting further application of the invention is a situation where the code rate and modulation may or may not stay the same but an intra-cell handover is performed, i.e. the old time slot allocation for a connection is cancelled and a new (set of) time slot(s) is allocated instead. In a conventional intra-cell handover the transmitting device has totally switched channels, resulting in one interleaving buffer being emptied first on the old channel and another interleaving buffer being thereafter filled up on the new channel. This in turn has caused a temporary break in the transmission of data. The invention could be applied so that a common interleaving buffer would be used for code words aimed for transmission on both channels, using the method of the invention to interleave code words of different lengths if necessary, and only the train of digital or analogue bursts would be directed to the new time slot(s) from a certain frame onwards. The receiver would similarly direct the received, downconverted/demodulated and deciphered digital bursts into a common deinterleaving buffer regardless of the time slot(s) they have arrived in. The break in transmission would be avoided.

Applying the invention to an inter-cell handover would require that the two base stations taking part in the handover would rapidly share information about the code words that they have in their interleaving/deinterleaving buffers, which is not feasible in present-day cellular radio networks. Consequently it is seen that the invention is not reasonably applicable to inter-cell handovers.

The controlling of transmission power in a cellular radio network may cause some consequences for the applicability of the invention. Usually when the network allocates a time slot from a TDMA frame to a certain connection, it determines the limits of transmission power that can be used for transmission in the allocated time slot. The determination of the limits takes place typically in a base station controller. Transmission power is thereafter controlled within the given limits by frequently measuring the receiver power and/or the bit error rate or some other quality-related factor of the received signal and using the results for applying known open-loop or closed loop control in the mobile station and the base station it communicates with. In some systems if the communicating devices find that the given limits are becoming unreasonable, one of them may send the base station controller a request for changing the limits. The base station controller may also maintain a continuous control over the transmission power limits by observing measurement reports sent by the base stations.

Because the transmission symbols of higher-order modulation methods differ from each other less than the transmission symbols of lower-order modulation methods, it is easier to confuse or misinterprete them in reception. As a consequence, the use of a higher-order modulation method necessitates a better signal-to-noise ratio or a signal-to-interference ratio. This in turn translates into higher transmission power if the noise and interference characteristics of the environment stay the same. It may happen that in connection with a change from a higher-order modulation method to a lower-order modulation method the base station controller determines such a low transmission power maximum for the newly allocated lower-order time slots that during the transition period it is impossible both to obey the transmission power limit and to continue transmitting successfully with the higher-order modulation method.

There are three possible solutions to the problem. The first possibility is to limit the application of the invention only to those situations where also the power limits for the newly allocated lower-order modulation time slots will allow the successful use of the higher-order modulation method during the transition period. In other situations the invention could not be used, resulting in a mandatory short break in the connection. The second possibility is to allow the transmitting device to apply the old transmission power limits until the end of the transition period. The third possibility is to set the maximum transmission power for the newly allocated time slots to be equal to the absolute maximum transmission power that the mobile station in question is allowed to use on the lower-order modulation. This is based on the assumption that the network will prefer optimised transmission power control over optimised interleaving.

The specifications that are public at the time of filing the present patent application define the signalling of a "starting time" in association with a link adaptation operation. A conventional command for executing a link adaptation operation will include, among others, a "starting time" field which announces the number of the first transmission burst in which the new coding scheme, modulation method or other factor is applicable. The present invention may require a newly formulated definition for the "starting time". There are at least six possible practices that can be adopted:

- the number announced in the "starting time" field corresponds to the first transmission burst that includes at least some information handled according to the executed link adaptation command,
- the number announced in the "starting time" field corresponds to the last transmission burst that includes at least some information handled as before the executed link adaptation command,
- the number announced in the "starting time" field corresponds to the first transmission burst that contains exclusively information handled according to the executed link adaptation command,
- the number announced in the "starting time" field corresponds to the last transmission burst that contains exclusively information handled as before the executed link adaptation command,
- there are at least two different announced starting times, each one of them corresponding to a different phase of the link adaptation operation (transmission power change, modulation change, code rate change etc.), or
- a single starting time is announced, and from it the devices taking part in the communication calculate the starting times for the different phases of the link adaptation operation; for the calculation they use a common preprogrammed algorithm.

Figure 7:
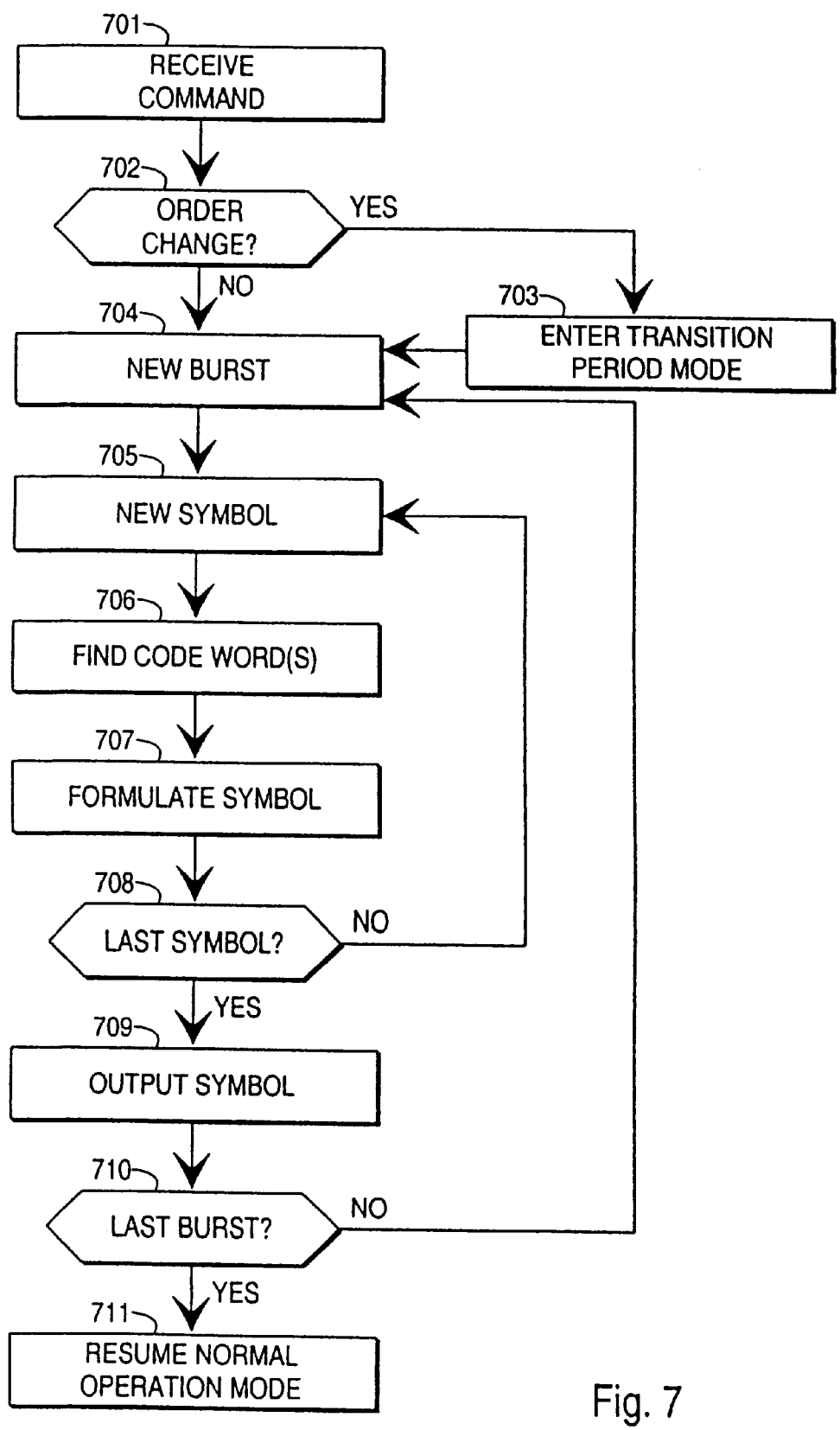
FIG. 7 illustrates a method according to the invention in a transmitter and FIG. 8 illustrates a method according to the invention in a receiver.

The method according to a preferable embodiment of the invention for the operation of a transmitter, shown in FIG. 11, is summarised in the form of a flow diagram in FIG. 7. Operation starts at state 701 when a link adaptation command is received either from a different device in the radio telecommunications system or from the control unit of the same device which functions as a transmitter. At state 702 the transmitter examines, whether the link adaptation command causes a change of modulation order. If the answer in state 702 is positive, the transmitter enters a transition period mode according to state 703, in which it uses the higher-order modulation method at least in one of the available time slots; detailed discussion of the transition period mode has been given above. State 704 corresponds to commencing the formulation of a new digital burst in the interleaver. The digital, burst formulation consists of a loop, in which state 705 means that a new symbol is taken under consideration, state 706 means finding the code word(s) which will determine the contents of the symbol under consideration and state 707 means generating the symbol contents with an operator T and inserting them as the value of the symbol. In state 708 the transmitter examines, whether this was the last symbol of the burst. A negative answer causes a transition back to state 705 and a positive answer causes the completed burst to be directed out of the interleaver/burst formatter according to state 709. In state 710 the transmitter examines, whether this was the last burst of an interleaving period that may contain bits from the time before the link adaptation command was received. A positive answer causes the transmitter to disable the transition period mode and resume normal operation according to state 711. A negative answer in state 710 causes a jump back to state 704.

Figure 8:
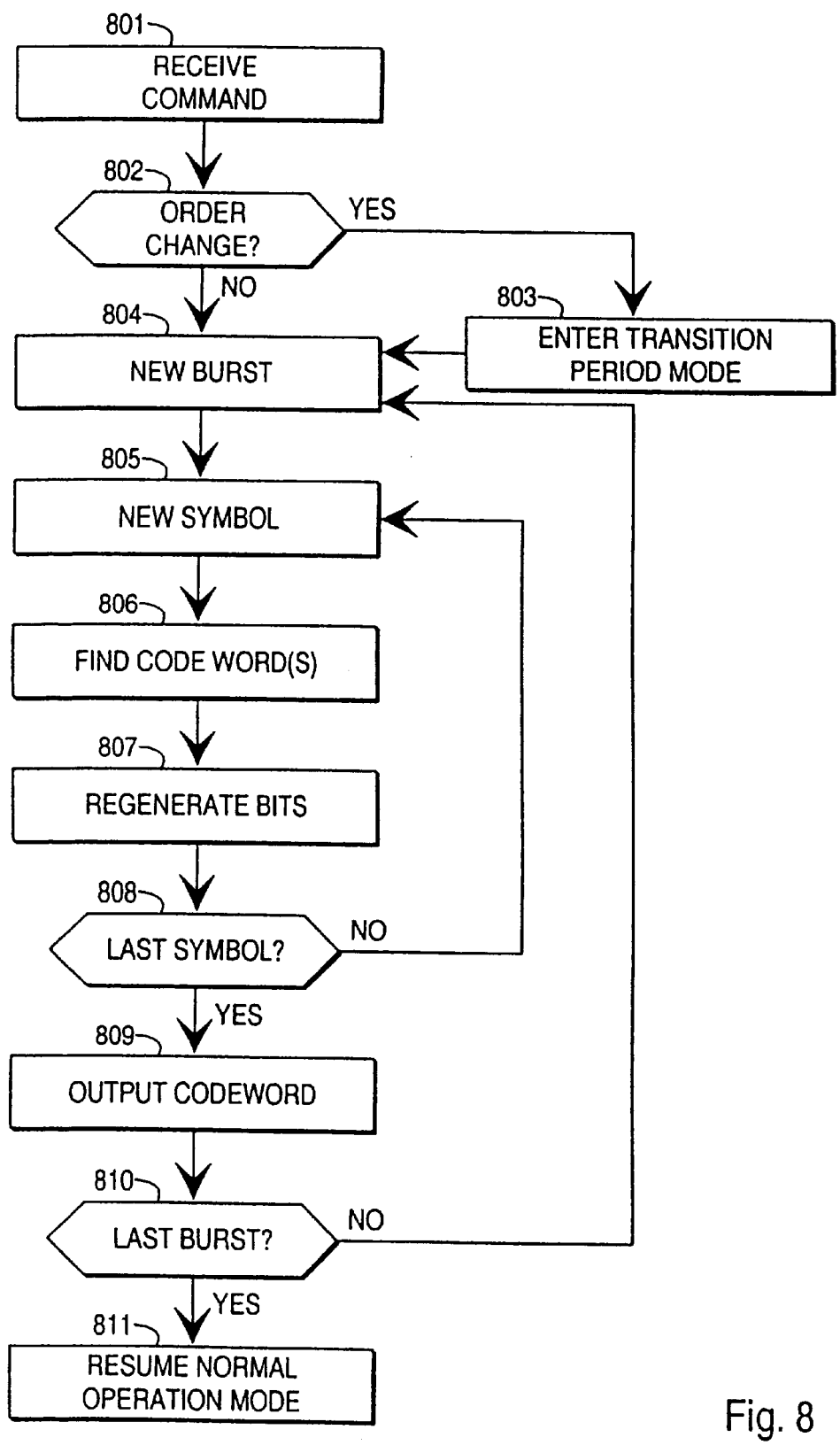

Similarly, FIG. 8 illustrates the method according to a preferable embodiment of the invention for the operation of a receiver in the form of a flow diagram. Receiver operation starts at state 801 when a link adaptation command is received again either from a different device in the radio telecommunications system or from the control unit of the same device which functions as a receiver. At state 802 the receiver examines, whether the link adaptation command causes a change of modulation order. If the answer in state 802 is positive, the receiver enters a transition period mode according to state 803, in which it demodulates the received signal in at least one of the available time slots with the method that corresponds to the higher-order modulation method. The transition period mode of the receiver is thus the exact counterpart of that of the transmitter.

State 804 correponds to commencing the de-interleaving of a new digital burst in the deinterleaver. The operation again consists of a loop, in which state 805 means that a new symbol is taken under consideration, state 806 means finding the code word(s) which will receive the information carried by the symbol under consideration and state 807 means regenerating the respective code word bits with an operator $T^{-1}$ which is the inverse of the operator T. In state 808 the receiver examines, whether this was the last symbol of the burst. A negative answer causes a transition back to state 805 and a positive answer causes the completely de-interleaved digital burst to be deleted from memory and correspondingly the completely reconstructed code word to be directed out of the deinterleaver according to state 809. In state 810 the receiver examines, whether this was the last burst of an interleaving period that may contain bits from the time before the link adaptation command was received. A positive answer causes the receiver to disable the transition period mode and resume normal operation according to state 811. A negative answer in state 810 causes a jump back to state 804.

A transmitter according to the invention must have an interleaving buffer like that in FIG. 4 where each location for a code word is capacious enough to house the longest possible code word allowed in the system. The interleaver/burst formatter of the transmitter must also be arranged to operate according to the method explained above, which is usually taken care of by writing the appropriate commands into machine-readable form and using them as the program for the Digital Signal Processor (DSP) that takes care of interleaving and burst formatting in the transmitter. Similarly in a receiver according to the invention there must be a de-interleaving buffer dimensioned to house even the longest possible code words and a deinterleaver arranged to operate according to the method explained above. Programming a DSP to perform such operations is as such known to the person skilled in the art.

What is claimed is:

1. A method for compensating for changing data rates in a communication connection between a transmitting device and a receiving device, in which communication connection information to be transmitted is in a form of bits grouped to code words, and bits are diagonally interleaved from code words into symbols, a predetermined number of consecutive symbols constituting a burst, the method comprising:
constructing a certain symbol from a predetermined set of rules for keeping a symbol rate constant regardless of a changing data rate, and
choosing the predetermined set of rules according to a length of code words from which the certain symbol is being constructed.

2. A method according to claim 1, further comprising:
taking a set of t bits from the code words from which the certain symbol is being constructed, where t is larger than or equal to zero and smaller than or equal to the number s of bits in the certain symbol,
operating on said set of t bits with a known operator T, the form of which depends on the length of the code word from which the certain symbol is being constructed and includes a predetermined combination of identity operation, order change, duplication, inversion, mapping and addition of bits, and which produces as a result a set of s bits, and
inserting the resulting s bits as the value of the symbol being constructed.

3. A method according to claim 2 wherein, for code words filling all bit positions in the symbols to be constructed, said operator T consists of arranging the bits from the code words into the bit positions of the symbols in a predetermined order, and for code words not filling all the bit positions in the symbols to be constructed, said operator T consists of mapping a number of first predetermined bit patterns in the code words into a number of predetermined bit patterns in the bit positions of the symbols.

4. A method according to claim 3, wherein said first predetermined bit patterns in the code words are single bits.

5. A method according to claim 1 wherein, in a case where the change of data rates incorporates a change in the modulation method with which the bursts are to be transmitted from an old modulation method to a new modulation method which is of a different order than said old modulation method, the method comprises the steps of:
classifying the bursts to be transmitted to those bursts consisting of only bits to be transmitted with the old modulation method, those bursts consisting both of bits to be transmitted with the old modulation method and of bits to be transmitted with the new modulation method, and those bursts consisting of only bits to be transmitted with the new modulation method, and
for a transition period during which there are those bursts to be transmitted that consist both of bits to be transmitted with the old modulation method and of bits to be transmitted with the new modulation method, transmitting these bursts with the one of the modulation methods which is of higher order.

6. A method according to claim 5, wherein during said transition period all bursts are transmitted with the one of the modulation methods which is of higher order.

7. A method according to claim 5, wherein said modulation methods are 8PSK and GMSK in any order.

8. A transmitter for transmitting information in a communication connection to a receiving device, in which communication connection
information to be transmitted is in a form of bits grouped to code words, and
the bits are diagonally interleaved from the code words into symbols, a predetermined number of consecutive symbols constituting a burst,
the transmitter comprising:
means for constructing a certain symbol according to a predetermined set of rules, and
means for choosing said predetermined set of rules according to a length of code words from which the certain symbol is being constructed.

9. A method for compensating for changing data rates between a transmitting device and a receiving device, wherein information to be transmitted is in the form of bits grouped to code words, the bits are diagonally interleaved from the code words into symbols, and a predetermined number of consecutive symbols constitute a burst, the method comprising:
constructing a certain symbol from a predetermined set of rules for keeping a symbol rate constant regardless of a changing data rate; and
choosing the predetermined set of rules according to a length of the code words from which the certain symbol is being constructed.

\* \* \* \* \*